United States Patent [19]
Kuroda et al.

[11] Patent Number: 5,373,324
[45] Date of Patent: Dec. 13, 1994

[54] PROGRAM SELECTING AND CHARACTER BROADCASTING RECEIVING SET

[75] Inventors: Kazuo Kuroda; Tsuyoshi Hasebe, both of Tokorozawa, Japan

[73] Assignee: Pioneer Electronic Corporation, Tokyo, Japan

[21] Appl. No.: 961,411

[22] Filed: Oct. 15, 1992

[30] Foreign Application Priority Data

Feb. 18, 1992 [JP] Japan ................... 4-031047

[51] Int. Cl.⁵ ........................................... H04N 7/087
[52] U.S. Cl. ..................................... 348/468; 345/146; 345/156
[58] Field of Search .................. 340/706–710; 358/142, 147, 183, 188, 242, 22; 348/461, 465, 468; 345/156, 157, 161, 162, 163, 167, 168, 146, 145; H04N 7/08, 7/087, 5/44, 5/45

[56] References Cited

U.S. PATENT DOCUMENTS

4,587,520  5/1986  Astle ........................... 340/712
4,992,871  2/1991  Bensch et al. ............... 358/142

FOREIGN PATENT DOCUMENTS

2192770  1/1988  European Pat. Off. .
0209277  6/1983  Japan .

*Primary Examiner*—David E. Harvey
*Attorney, Agent, or Firm*—Sughrue, Mion, Zinn, Macpeak & Seas

[57] ABSTRACT

A character broadcasting receiving set is provided with: a receiving device for receiving a character signal transmitted from a broadcasting station; a decoding device for decoding the received character signal; and a displaying device, including a screen, for displaying one of character broadcasting programs including a menu program to select a desired program out of the character broadcasting programs, on the screen on the basis of the decoded character signal. The character broadcasting receiving set is also provided with: an inputting device for inputting and specifying, on the screen, a display position of a program number among characters in the displayed menu program; and a display controlling device for controlling the displaying device to display the character broadcasting program corresponding to the program number which display position is specified by the inputting device.

6 Claims, 9 Drawing Sheets

FIG.3A

| | CHARACTER BROADCASTING MENU | | | | | | | | | |
|---|---|---|---|---|---|---|---|---|---|---|
| #01 | NEWS | | | | | | | | | |
| #05 | WEATHER | | | | | | | | | |
| #00 | PROGRAM | LIST | | | | | | | | |

PH / MN 203, 192, 247 [PICTURE ELEMENT]

15.5 CHARACTERS (STANDARD), [PICTURE ELEMENT]

8 LINES (STANDARD)

FIG.3B SMALL-SIZE 8 × 12

FIG.3C INTERMEDIATE-SIZE 8 × 24

FIG.3D STANDARD-SIZE 16 × 24

FIG. 4A
DISPLAY SCREEN

| X: | 1 | 2 | 3 | 4 | 5 | 6 | 7 | 8 | 9 |
|---|---|---|---|---|---|---|---|---|---|
| Y:1 | | | | | | | | | |
| 2 | # | 1 | | TOD | AY'S | | W|EAT | HER | |
| 3 | # | 2 | | CO | OK | | | | |
| 4 | # | 3 | | TRA | FFI | C I | NFO | RMA | TION |
| 5 | # | 4 | | STO | CKS | I | NFO | RMA | TION |
| 6 | | | | | | | | | |

FIG. 4B
TABLE-FORMING REGION

| Y:1 | FF | FF | FF | -- | -- | -- | -- | -- | FF |
|---|---|---|---|---|---|---|---|---|---|
| 2 | FF | 01 | FF | | | | | | : |
| 3 | FF | 02 | FF | | | | | | : |
| 4 | FF | 03 | FF | (THESE AREAS "FF") | | | | | : |
| 5 | FF | 04 | FF | | | | | | : |
| 6 | FF | FF | FF | -- | -- | -- | -- | -- | FF |

FIG. 4C
TABLE-FORMING REGION (INITIAL STATE)

| Y:1 | FF | FF | | | | | | | FF |
|---|---|---|---|---|---|---|---|---|---|
| 2 | FF | | | | | | | | |
| 3 | : | | (ALL AREAS "FF") | | | | | | |
| 4 | : | | | | | | | | |
| 5 | : | | | | | | | | : |
| 6 | FF | -- | | | | | | -- | FF |

PROGRAM SELECTING AND CHARACTER BROADCASTING RECEIVING SET

BACKGROUND OF THE INVENTION

1. Field of the Invention

This invention relates to a receiving set for a character broadcasting system, and particularly to a receiving set for a character broadcasting system in which a program selection can be easily carried out.

2. Description of Related Art

Character broadcasting programs which are receivable by a receiving set for the character broadcasting system (hereinafter referred to as "character broadcasting receiving set") contain a menu program for selecting a desired program from the various character broadcasting programs. In the menu program, program numbers and program titles for the character broadcasting programs are displayed on a display screen. If a (TV) viewer wants to watch a desired character broadcasting program, he inputs a program number for the desired character broadcasting program through a remote controller or the like to receive the program and watch it on a television or the like.

Specifically, when the viewer wants to watch a program of the character broadcasting programs identified as the "channel 8" program, for example, the desired (channel 8) program is selected from the character broadcasting programs by (1) pushing a number key "8", and then
(2) pushing a confirmation key such as a "RETURN" key.

If an incorrect number key is erroneously pushed, in the above case, the following operations are required:

(1) for example, when a number key "7" is erroneously pushed,
(2) push a release key such as a "CANCEL" key,
(3) push a correct key "8", and
(4) push a confirmation key such as a "RETURN" key.

In this manner, several pushing operations of the buttons of the remote controller are required to display a desired program on a television or the like, and thus the manipulation of the remote controller is cumbersome to a viewer who is unaccustomed to the manipulation of the remote controller.

SUMMARY OF THE INVENTION

It is therefore an object of the present invention to provide a character broadcasting receiving set in which a viewer's manipulation for program selection of character broadcasting programs can be easily performed.

According to the present invention, the above mentioned object can be achieved by a character broadcasting receiving set provided with: a receiving device for receiving a character signal transmitted from a broadcasting station; a decoding device for decoding the received character signal; and a displaying device, including a screen, for displaying one of character broadcasting programs including a menu program to select a desired program out of the character broadcasting programs, on the screen on the basis of the decoded character signal. The character broadcasting receiving set is also provided with: an inputting device for inputting and specifying, on the screen, a display position of a program number among characters in the displayed menu program; and a display controlling device for controlling the displaying device to display the character broadcasting program corresponding to the program number which display position is specified by the inputting device.

In the operation of the character broadcasting receiving set of the present invention thus constructed, the menu program to select a desired program out of the character broadcasting programs is displayed on the screen. Here, the display position of the program number of the character broadcasting program is desired to be watched is specified by use of the inputting device, such as a pointing device, in the displayed menu program on the screen. Then, the display controlling device, such as a microcomputer (controller) controls the displaying device to display the character broadcasting program corresponding to the program number which display position is specified by the inputting device. Therefore, a desired program can be displayed merely by specifying a display position on the screen by use of the inputting device such as a pointing device (a light pen, a mouse, a mouse tablet etc.), which can be handled rather easily. Thus, for example, a viewer may select a program by a "point-and-click" selection of a program identifier appearing on the screen, instead of having to input values on a remote or attached control box.

In one aspect of the present invention, the character broadcasting receiving set is further provided with a memory device for storing display position data, which indicate the display positions of at least program numbers among the characters in the displayed menu program, and display content data, which indicate values of the program numbers in association with the corresponding display positions. In this case, the display controlling device controls the displaying device on the basis of the display position data and display content data stored in the memory device. In this case, the memory device may be adapted to store the data in such a manner that storage positions of the data correspond to the display positions of the data on the screen.

In another aspect of the present invention, the display controlling device may be adapted to judge whether the specified display position corresponds to the program number or other characters in the displayed menu program on the screen. The display controlling device controls the displaying device to display the character broadcasting program when it judges the specified display position corresponds to the program number. This judgement may be performed on the basis of the aforementioned display position data and display content data stored in the memory device. In this case, upon specifying the display position on the screen, the display controlling device displays the program when the display content of the character displayed at the specified display position corresponds to the program number for the program according to the display position data and display content data stored in the memory.

Consequently, the manipulation is greatly improved, and an user who is unaccustomed to the manipulation can also easily watch a desired program, according to the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3A–3D or diagrams showing a display state of a display used in the receiving set of FIG. 1;

FIG. 4a–4C are diagrams showing a data storage state of a table region which corresponds to a display state of the display in the receiving set of FIG. 1;

DETAILED DESCRIPTION OF THE PREFERRED EMBODIMENTS

A preferred embodiment according to this invention will be hereunder described with reference to FIGS. 1 to 9.

Figure 1:
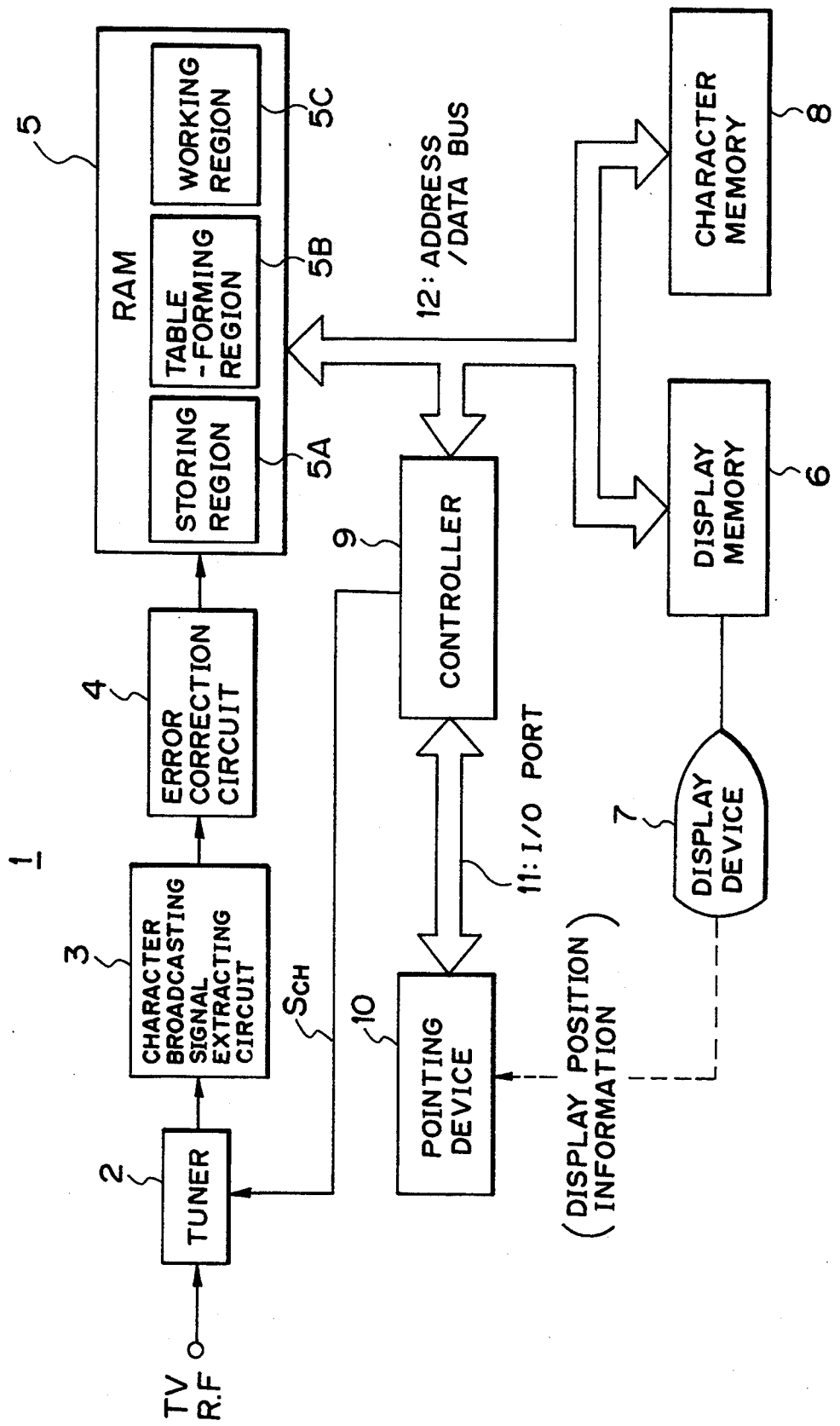
FIG. 1 is a block diagram showing the construction of a receiving set for a character broadcasting system as one embodiment of the present invention.

FIG. 1 is a block diagram showing the construction of a character broadcasting receiving set 1 as one embodiment of the present invention. As shown in FIG. 1, the character broadcasting receiving set 1 includes a tuner 2 for conducting a tuning operation on electric wave for television, which is received by an antenna (not shown), on the basis of a channel switching signal $S_{CH}$ and outputting the tuned electric wave as a video intermediate frequency signal, a character broadcasting signal extracting circuit 3 for extracting a character broadcasting signal which is superposed over the outputted video intermediate frequency signal, an error correction circuit 4 for subjecting the extracted character broadcasting signal to an error correction process to output the corrected signal as display code data, a RAM (Random Access Memory) 5 for storing various data, a display memory 6 for storing display data on the basis of the contents of the RAM 5, a display device 7 for carrying out various kinds of displays on the basis of the contents of the display memory 6, a character memory 8 for storing character data to be displayed on the display device 7 in correspondence to the display code data, a controller 9 for outputting the channel switching signal $S_{CH}$ and controlling the whole system of the receiving set 1, and a pointing device 10, such as a mouse device, a mouse tablet device, a light pen device etc., for specifying a display position on the display device 7 which is connected through the controller 9 and an I/O port 11 to the pointing device 10. The controller 9, the RAM 5, the display memory 6 and the character memory 8 are connected to one another through an address/data bus 12.

The RAM 5 includes a storing region 5A for character broadcasting data in which the display code data are stored, a table-forming region 5B in which a table for identifying a program number to be selected is formed, and a working region 5C in which various kinds of works are temporarily executed.

The display device 7 may includes a CRT (Cathode Ray Tube) display device, LCD (Liquid Crystal Display) device, EL (Electroluminescence) display device and so on.

Figure 2:
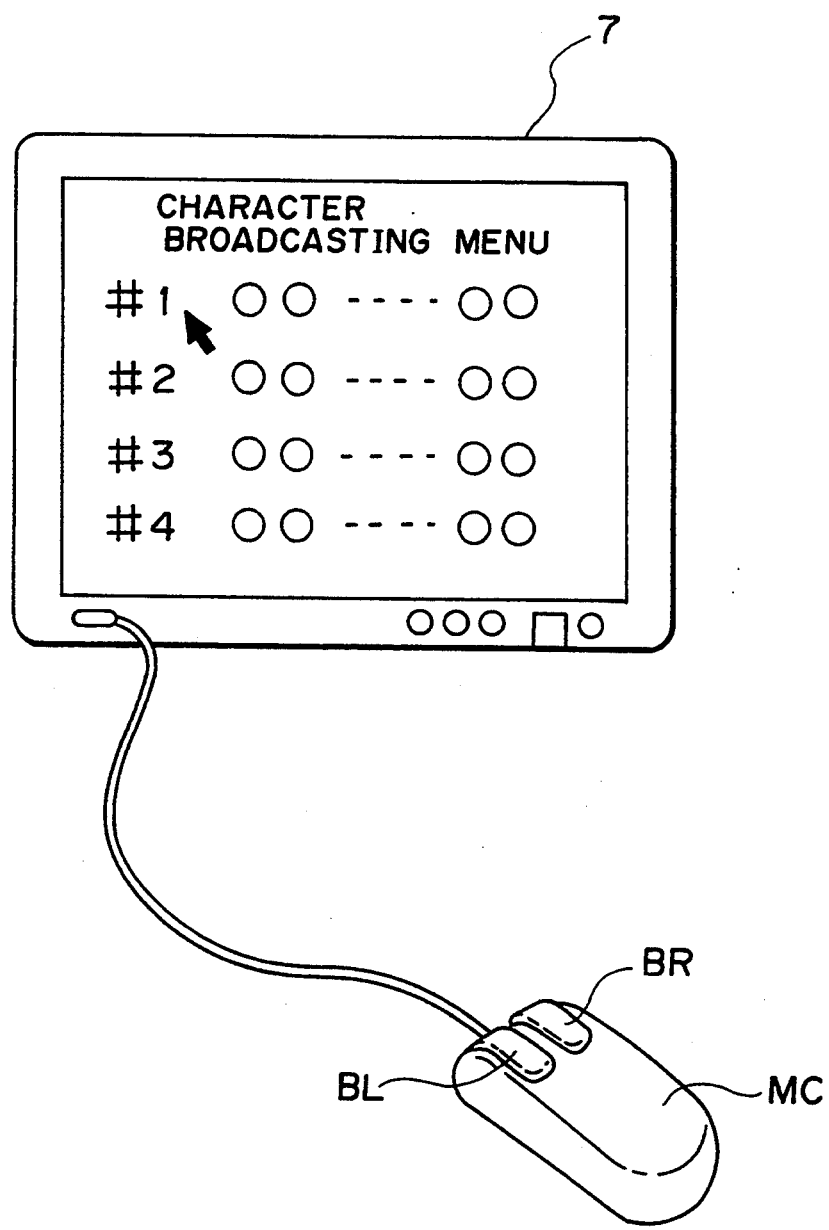
FIG. 2 is an outline of the receiving set for the character broadcasting system of FIG. 1.

FIG. 2 is an outline of the character broadcasting receiving set of the present embodiment.

The main body of the character broadcasting receiving set is connected to a mouse MC serving as the pointing device 10. The mouse MC is equipped with a setting button (left button) BL and a menu selecting button (right button) BR. Each of the buttons BL and BR is pushed down (clicked) to operate. A black arrow on the display screen of the display device 7 represents a specified position by the mouse MC.

The menu program (screen) on the display device 7 includes, for example, a page header PH at which "CHARACTER BROADCASTING MENU" is displayed, and a menu area MN having 15.5 characters×8 lines (for standard characters) as shown in FIG. 3A, and the display image of the menu screen comprises 248×204 picture elements as shown in FIG. 3A. Nine kinds of characters such as a small-size character (8×12 picture elements: FIG. 3B), an intermediate-size character (8×24 picture elements: FIG. 3C), a standard-size character (16×24 picture elements: FIG. 3D), etc. can be displayed as a normal character which can be displayed by the character broadcasting receiving set.

Next, an operation of the character broadcasting receiving set of this embodiment will be described with reference to FIGS. 4 to 9. In an actual character broadcasting receiving set, 15.5 (characters)×9 (lines: including a page header portion) can be displayed for the standard character on one frame as described above, however, in order to simplify the description, the following description is made particularly in a case where intermediate-size characters of 9 (characters)×6 (lines: excluding a page header portion) are displayed. It is assumed that at an initial stage (at the time when a display for a program selection screen is selected), "FFh" (h represents hexadecimal number) is written in all areas of the table-forming region 5B. In addition, it is assumed that the program number of a previously-received character broadcasting program is held in a program number holding region (not shown) of the RAM 5.

When the electric wave for television which is received by the antenna (not shown) is tuned by the tuner 2 and outputted as a video intermediate frequency signal, the character broadcasting signal extracting circuit 3 extracts character broadcasting signals which are superposed on 14th-H 15th-H, 16th-H and 21st-H (H:Horizontal period) in a vertical retrace period of the output video intermediate frequency signal, and outputs the extracted signals to the error correction circuit 4. The error correction circuit 4 conducts the error correction on the extracted character broadcasting signals to output the corrected signals to the RAM 5 as the display code data. When the display code data after the error correction is stored in the RAM 5, the controller 9 stores the display data in the display memory 6 by making reference to the display code data in the RAM and the character memory 8.

Consequently, for example, a frame as shown in FIG. 4A is displayed on the display screen of the display device 7. In this case, data (01, 02, 03 and 04) corresponding to program numbers are stored into a region for program (channel) numbers of the table-forming region 5B which is indicated by a dashed line in FIG. 4B.

Figure 5:
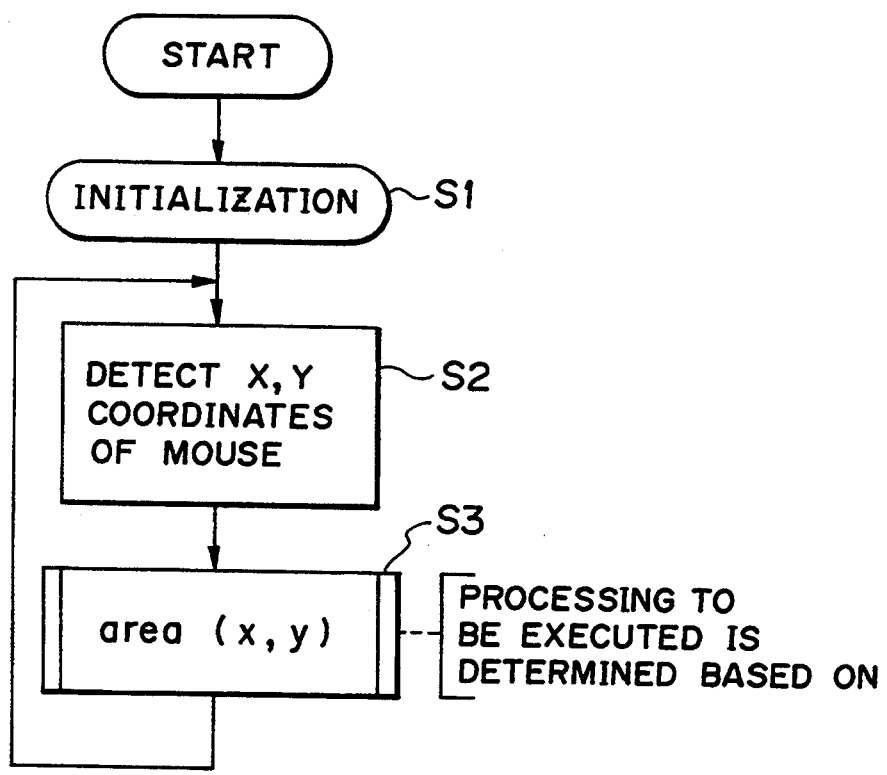
FIG. 5 is a flow chart (1) for an operation of the receiving set of the embodiment.

Firstly, as shown in FIG. 5, the controller 9 carries out various kinds of initialization (at the step S1), and detects a coordinate (X,Y) on the screen (coordinate indicated by a black arrow of FIG. 4A of the mouse MC serving as the pointing device 10 (at the step S2). In this case, the coordinate (x, y) of the mouse MC is given on a picture-element basis. In an actual character broadcasting frame (a display of 15.5 (characters)×8 (lines)+page header 1 (line)), the coordinate of the mouse MC satisfies the following inequalities:

$$0 \leq x \leq 247$$

$$0 \leq y \leq 203$$

On the other hand, in this embodiment (display (intermediate-size characters) of 9 (characters)×6 (lines)), the coordinate of the mouse MC satisfies the following inequalities:

$$0 \leq x \leq 71$$

$$0 \leq y \leq 143$$

More specifically, for example, in a case as shown in FIG. 4A, the coordinate of the mouse MC (x,y)=(13, 63).

Subsequently, the controller shifts its process to a subroutine [area] (at the step S3), and a process to be executed is determined on the basis of the coordinate (x,y) of the mouse.

Figure 6:
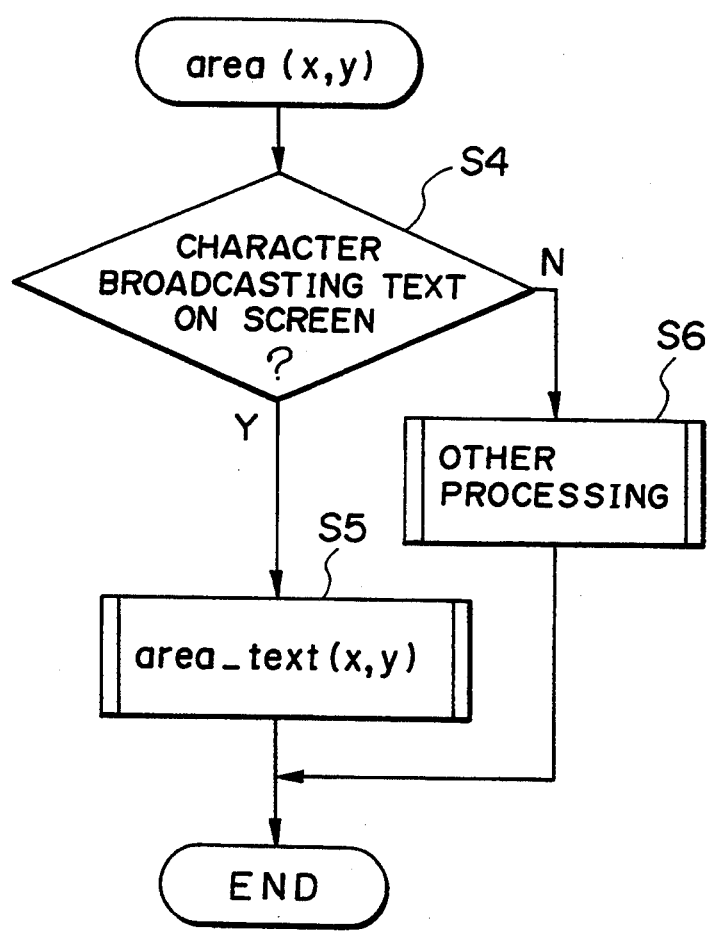
FIG. 6 is another flow chart (2) for the operation of the receiving set of the embodiment.

As shown in FIG. 6, in the subroutine [area], it is first judged (at the step S4) whether the character broadcasting text frame is displayed on the screen or not. If it is judged not to be on the screen (NO), other necessary process is carried out (at the step S6), and the process is returned to the main routine of FIG. 5.

In FIG. 6, at the step S4, if the character broadcasting text frame is judged to be on the screen (YES), the process is shifted to a subroutine [area_text] (at the step S5).

Figure 7:
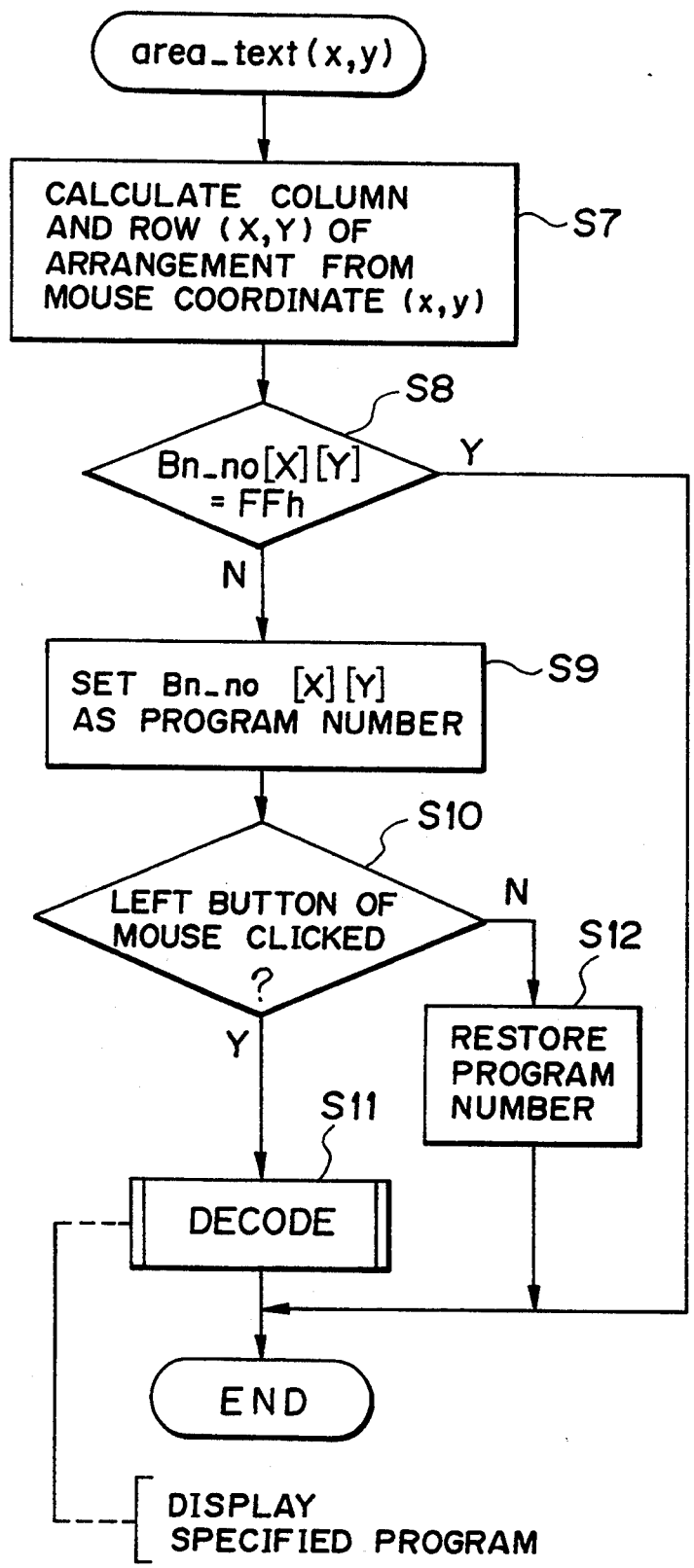
FIG. 7 is another flow chart (3) for the operation of the receiving set of the embodiment.

In FIG. 7, on the basis of the coordinate (x,y) of the mouse MC, the controller 9 first calculates a column and a row (X, Y) on which data corresponding to an arrangement Bn_no set on the table-forming region 5B is stored (at the step S7).

More specifically, for example, the column and row (X,Y) is calculated in accordance with the following equations.

$$\begin{aligned}
X &= INT\,((x\text{-coordinate})/(\text{number of picture elements in } x\text{-direction in a one-character area})) + 1 \\
&= INT\,(x/8) + 1 \\
Y &= INT\,((y\text{-coordinate})/(\text{number of picture elements in } y\text{-direction in a one-character area})) + 1 \\
&= INT\,(y/24) + 1
\end{aligned}$$

Here, INT (R) represents an integer portion of R.

Subsequently, the controller 9 judges on the basis of the calculated column X and row Y whether an arrangement element Bn_no[X][Y] is equal to "FFh" or not (at the step S8). If the calculated arrangement element Bn_no [X][Y] is judged to be equal to "FFh" (YES), the process of the subroutine [area_text] is completed without being further executed.

If the calculated arrangement element Bn_no[X][Y] is judged not to be equal to "FFh" (NO) at the step S8, Bn no[X][Y] is set as a program number in a program number holding area (not shown) of the RAM 5 (at the step S9). At this time, a program number which has been already set in the program number holding area is retracted to a program number retraction area (not shown).

Subsequently, it is judged (at the step S10) whether the left button of the mouse MC is clicked (the setting is settled) or not. If the left button of the mouse MC is judged not to be clicked (NO), the program number which has been retracted to the program number retraction area is returned to the program number holding area to restore the program number (at the step S12), and then the process is finished.

If the left button of the mouse MC is judged to be clicked (YES) at the step S10, the process is shifted to a subroutine [DECODE] (at the step S11) to display the specified program number, and the initialization and rearrangement of the table-forming region 5B are carried out as following.

Figure 8:
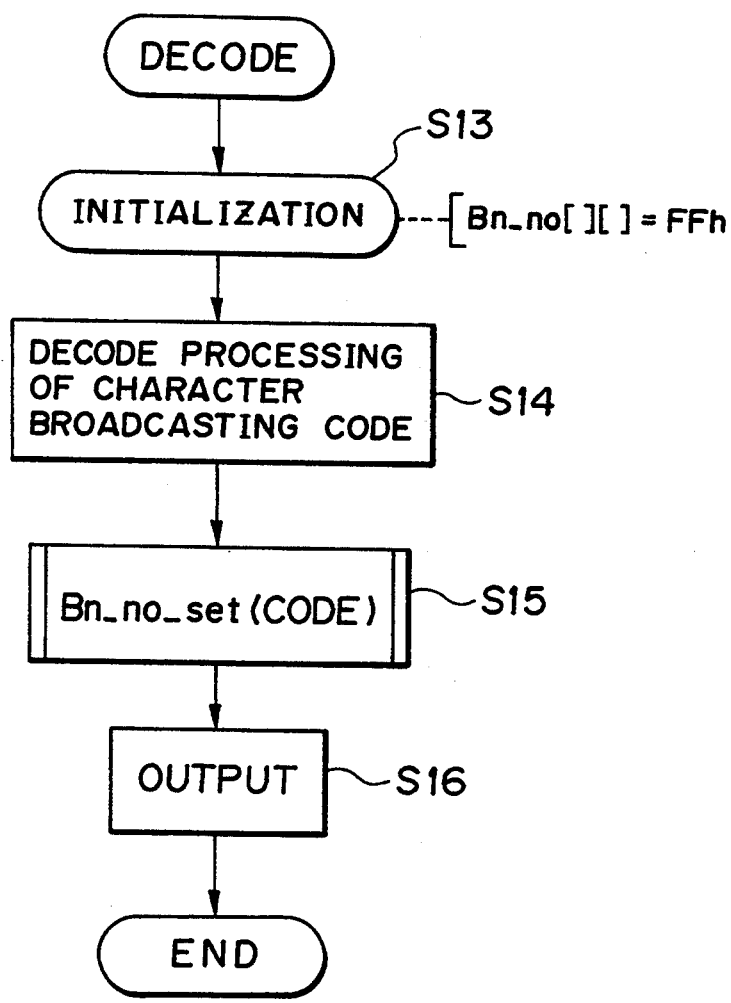
FIG. 8 is another flow chart (4) for the operation of the receiving set of the embodiment.

Namely, in FIG.8, in the subroutine [DECODE], the controller 9 first initializes the table-forming region 5B, and sets all of the arrangement elements Bn_no[X][Y] to be equal to "FFh". Through this operation, the table-forming region 5B is kept to be the state as shown in FIG. 4C again.

Subsequently, the controller 9 conducts a decode processing of the display code (at the step S14) to calculate display code CODE, and a processing in a subroutine [Bn_no_set] is carried out (at the step S15).

Figure 9:
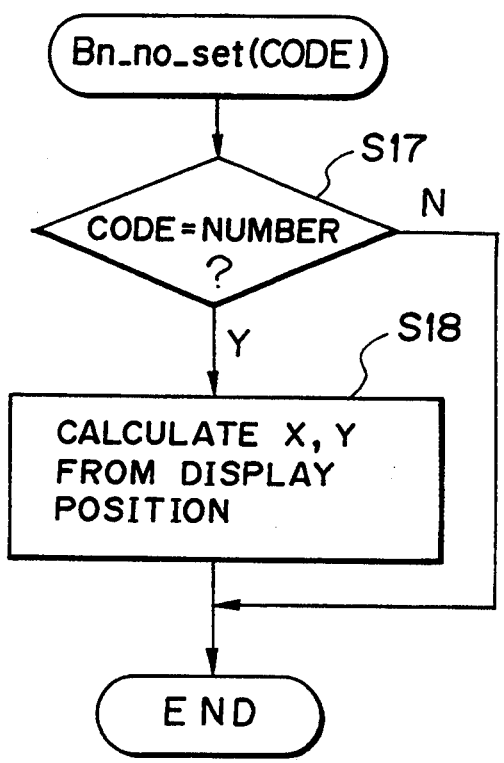
FIG. 9 is another flow chart (5) for the operation of the receiving set of the embodiment.

As shown in FIG.9, in the subroutine [Bn_no_set], the controller 9 judges (at the step S17) whether the calculated display code CODE is a number or not. If the display code CODE is judged not to be a number (NO), the processing of the subroutine [Bn_no_set] is finished without being further executed, and the process returns to the subroutine [DECODE] to output i.e. display the program of the specified program number (at the step S16) in FIG. 8. Return to the menu program from programs other than the menu program is performed by clicking the right button of the mouse MC.

On the other hand, in FIG. 9, if the display code CODE is Judged to be a number at the step S17 (YES), a column X and a row Y of the arrangement Bn_no[X][Y] are calculated on the basis of the current display position, and then the processing for substituting the value of the display code CODE into the current arrangement element is carried out as following (at the step S18):

$$Bn\_no[X][Y] \leftarrow CODE$$

As a result, as shown in FIG. 4B, a new arrangement for judgment is formed on the table-forming region 5B, and the process is finished.

In FIG. 8 again, thereafter, the character broadcasting receiving set 1 displays a desired character broadcasting program (at the step S16), and the process is finished.

With the construction as described above, the program selection can be carried out by merely clicking the left button of the mouse at a program channel display position on the display screen, so that the manipulation is greatly improved, and an user who is unaccustomed to the manipulation can also easily watch a desired program.

In the above embodiment, areas corresponding to the whole of the display frame (screen) are provided to the table-forming region 5B. However, the table-forming region 5B may be so designed as to be stored with only the display position information and display content information of the program numbers, and stored with no other codes ("FFH" in the above case). In this case, the same operation as described above can be carried out through the judgment of the controller as to whether the data corresponding to a display position specified by the pointing device is stored in the table-forming region or not. In addition, in this case, the capacity of the table-forming region can be reduced to a small capacity, so that the capacity of the RAM can be also reduced.

According to the present embodiment, the memory device serves to store the display position data and display content data of the display characters corresponding to at least numbers of the display characters of the program selection menu frame which are displayed on the screen of the display device in such a manner that the storage positions of these data correspond to the display positions of these data on the screen. Upon specifying a display position on the screen of the display device by the pointing device such as a light pen, a mouse, a mouse tablet or the like, the controller displays a program on the display device on the basis of the display position data and the display content data when the display content of a character displayed at the specified display position corresponds to a program number for the program. Therefore, a desired program can be displayed by only a specifying operation of the pointing device. Therefore, the manipulation is greatly improved, and an user who is unaccustomed to the manipulation can also easily watch a desired program.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A character broadcasting receiving set comprising:
a receiving means for receiving a character signal transmitted from a broadcasting station;
a decoding means for decoding the received character signal;
a displaying means, including a screen, for displaying on said screen on the basis of the decoded character signal, one of a plurality of character broadcasting programs including a menu program useable by a user to select a desired program out of the plurality of character broadcasting programs;
an inputting means for inputting and specifying a chosen program number from among characters in the displayed menu program by allowing the user to position an indicator on said display means at a chosen position selected from any of a plurality of display positions, said chosen position being a display position on the screen of the chosen program number;
a memory means for storing display content data, which indicate values of program numbers included in characters in the displayed menu program, at storage positions in a one-to-one correspondence with the display positions of said display content data; and
a display controlling means for controlling said displaying means to display the character broadcasting program corresponding to the chosen program number, on the basis of the storage positions and the display content data stored in said memory means, by reading the content data from said memory means at a storage position derived from said inputting means.

2. A character broadcasting receiving set according to claim 1, wherein said characters in the displayed menu program comprise a plurality of eligible program numbers and other characters, and wherein said display controlling means is adapted to judge whether said chosen position corresponds to one of the plurality of eligible program numbers, or to the other characters in the displayed menu program, and to control the displaying means to display the character broadcasting program associated with said one of the plurality of eligible program numbers when it judges the specified display position corresponds to said one of the plurality of eligible program numbers.

3. A character broadcasting receiving set according to claim 1, wherein said inputting means comprises a pointing device, said pointing device being one of a group consisting of a light pen, a mouse, and a mouse tablet.

4. A character broadcasting receiving set according to claim 2, wherein said inputting means comprises a pointing device, said pointing device being one of a group consisting of a light pen, a mouse, and a mouse tablet.

5. A character broadcasting receiving set according to claim 1, wherein said memory means comprises a region of a random access memory, which forms a table for identifying the program numbers.

6. A character broadcasting receiving set according to claim 2, wherein said memory means is adapted to store said one of the plurality of eligible program numbers when said display controlling means judges the specified display position corresponds to said one of the plurality of eligible program numbers.

* * * * *